United States Patent [19]

Lombardino et al.

[11] 3,862,319

[45] Jan. 21, 1975

[54] BENZOTHIAZINE DIOXIDES AS ANTI-THROMOBOTIC AGENTS

[75] Inventors: Joseph G. Lombardino; Edward A. Wiseman, both of New London, Conn.

[73] Assignee: Pfizer Inc., New York, N.Y.

[22] Filed: May 21, 1973

[21] Appl. No.: 362,518

Related U.S. Application Data

[63] Continuation-in-part of Ser. No. 114,037, Feb. 9, 1971, abandoned, which is a continuation of Ser. No. 829,713, June 2, 1971, abandoned.

[52] U.S. Cl. ............................ 424/246, 260/243 R
[51] Int. Cl. .......................................... A61k 27/00

[58] Field of Search ..................... 260/243; 424/246

[56] References Cited
UNITED STATES PATENTS

| | | | |
|---|---|---|---|
| 3,501,466 | 3/1970 | Rasmussen | 260/243 |
| 3,591,584 | 7/1971 | Lombardino | 424/246 |

*Primary Examiner*—Vincent D. Turner
*Attorney, Agent, or Firm*—Connolly and Hutz

[57] ABSTRACT

Certain 3,4-dihydro-4-oxo and 3-oxo-2H-1,2-benzothiazine-3-carboxamide and 4-carboxamide 1,1-dioxide compounds effective in the treatment of thrombosis are disclosed.

22 Claims, No Drawings

BENZOTHIAZINE DIOXIDES AS ANTI-THROMOBOTIC AGENTS

CROSS-REFERENCE TO RELATED APPLICATIONS

The subject application is a continuation-in-part of co-pending application Ser. No. 114,037, filed Feb. 9, 1971, now abandoned said application Ser. No. 114,037 in turn being a continuation of application Ser. No. 829,713, filed June 2, 1969, and now abandoned.

BACKGROUND OF THE INVENTION

This invention relates to organic compounds possessing anti-thrombotic properties. More particularly, it relates to certain benzothiazine dioxide derivatives which are useful in preventing and controlling thrombosis in animals, including humans.

In normal blood circulation, blood platelets which flow in the bloodstream move along separately. If, however, the endothelium of a blood vessel is damaged, platelets immediately adhere to the underlying collagen and then to each other to form platelet thrombi. This adhesion and aggregation are primary causes of thrombosis.

SUMMARY OF THE INVENTION

This invention discloses a method for the treatment of thrombosis in animals, including humans, which comprises the administration to said animals and humans of an effective dose of from 1 to 50 mg per day of a compound selected from the group consisting of those of the formulae:

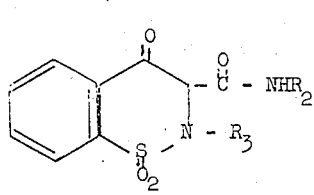
I and

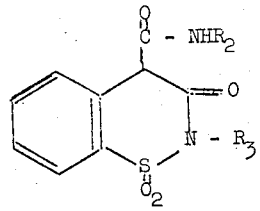
II and the base salts thereof with pharmacologically acceptable cations, wherein $R_2$ is chosen from the group consisting of alkyl having from one to three carbon atoms, phenyl, naphthyl, pyridyl, 3-methyl-2-pyridyl, 4-methyl-2-pyridyl, 5-methyl-2-pyridyl, 6-methyl-2-pyridyl, 5-chloro-2-pyridyl, 5-bromo-2-pyridyl, 2-pyrazinyl, 2-pyrimidyl, 4-pyrimidyl, 2-thiazolyl, 4-methyl-2-thiazolyl, 5-bromo-2-thiazolyl, 4,5-dimethyl-2-thiazolyl and mono and di-substituted phenyl wherein each substituent is fluorine, bromine or chlorine, alkoxy having from one to three carbon atoms, alkyl having from one to three carbon atoms or trifluoromethyl; $R_3$ is a member selected from the group consisting of hydrogen or alkyl having from one to three carbon atoms. It is to be understood that many of these compounds exist in the enolic form (i.e. they are tautomeric and can be 4-hydroxy or 3-hydroxy, as the case may be).

DETAILED DESCRIPTION OF THE INVENTION

The methods of preparation and chemical properties of the benzothiazine dioxides of this invention are described in U.S. Pat. No. 3,591,584. Included within the scope of the designated compounds are the pharmaceutically-acceptable acid addition salts.

The products of this invention are tested in vitro for anti-thrombotic activity by measuring their activity as inhibitors of the aggregation of rabbit, dog or human blood platelets induced by adenosine diphosphate or collagen using techniques described by Constantine, J. W., Nature 214, 1084 (1967) and by Born, G. V. R. and Cross, J. J. J., Journal of Physiology 168, 178 (1963). Sulfinpyrazone [1,2-diphenyl-4-(2-phenylsulfinylethyl)-3,5-pyrazolidinedione] is known to inhibit collagen-induced platelet aggregation, M. Packham et al., J. Exptl. Med. 126, 171 (1967), and is adopted as an internal standard for comparing compounds as inhibitors of collagen-induced blood platelet aggregation.

The compounds of this invention are tested in vivo on experimental thrombosis in dogs using techniques similar to those described by Born et al., British Journal of Experimental Pathology, 46, 569 (1965) or in Nature, 22, 761 (1964). Blood is withdrawn from treated dogs for determination of platelet counts and platelet responses to collagen and adenosine diphosphate.

Compounds of this invention are also tested in vivo in human volunteers. After drug administration, blood is withdrawn, and platelet responses to collagen and adenosine diphosphate are compared with those of blood drawn from human volunteer controls.

In accordance with a method of treatment of the present invention, the herein listed 3,4-dihydro-2H-1,2-benzothiazine-1,1-dioxide anti-thrombotic agents can be administered via the oral or parenteral routes of administration. In general, these compounds are most desirably administered in doses ranging from one to 50 mg. per day, although variations will occur depending upon the weight of the subject being treated.

The compounds of this invention may be administered alone or in combination with pharmaceutically-acceptable carriers, and such administration can be carried out in both single and multiple dosages.

For purposes of oral administration, tablets containing various excipients such as sodium citrate, calcium carbonate and dicalcium phosphate may be employed along with various disintegrants such as starch, alginic acid and certain complex silicates together with binding agents such as polyvinyl-pyrrolidone, sucrose, gelatin and acacia. Additionally, lubricating agents such as magnesium stearate, sodium lauryl sulfate and talc are often useful for tabletting purposes. Solid compositions of a similar type may also be employed as fillers in soft and hard-filled gelatin capsules; preferred materials would include lactose as well as high molecular weight polyethylene glycols. When aqueous suspensions and/or elixirs are desired for oral administration, the essential active ingredient therein may be combined with various sweetening or flavoring agents, coloring matter or dyes, and if desired, emulsifying and/or suspending agents as well, together with such diluents as water, ethanol, propylene glycol, glycerin and various combinations thereof.

For purposes of parenteral administration, solutions of these 3,4-dihydro-2H-1,2-benzothiazine-1,1-dioxides in sesame or peanut oil or in aqueous propylene glycol may be employed, as well as sterile aqueous solutions of the corresponding water-soluble alkali metal or alkaline-earth metal salts. Such aqueous solutions should be suitably buffered if necessary and the liquid diluent first rendered isotonic with sufficient saline or glucose. These particular solutions are especially suitable for intravenous, intramuscular and subcutaneous injection.

The following examples are given to more fully illustrate the invention. It is to be understood that these examples are for illustrative purposes only and that the invention is not meant to be limited to the specific details of the examples.

EXAMPLE I

The following in vitro evaluation is carried out according to the methods developed by Constantine, J. W., Nature, 214, 1084 (1967) and Born, G. V. R. and Cross, J. J. J., Journal of Physiology, 168, 178 (1963). Anaesthetized male rabbits are bled from a carotid artery into plastic centrifuge tubes containing 0.1 volume 3% sodium citrate. Platelet-rich plasma is separated by centrifugation at 100 G for 10 minutes at 20°C. Plasma from 3 animals is pooled; 5 ml samples are placed into clear plastic cuvettes and stirred at 1000 rpm. The collagen is prepared by mincing tendon from freshly excised rabbit tendon with scissors, grinding with commercial sea sand and 0.154 M sodium chloride solution by mortar and pestle to the consistency of coarse paste. After transfer to an Erlenmemeyer flask, more sodium chloride solution is added (25 ml per 4 grams tendon). The mixture is shaken mechanically for about 60 minutes, then centrifuged at 1,500 G for about 10 minutes. The collagen supernatant is added at about 0.25 to about 0.30 ml/4 ml plasma immediately after the addition of the drugs contained in 0.05 ml at a concentration of $6 \times 10^{-4}$ M. Changes in optical density are followed with a Spectronic 20 colorimeter attached to a Houston Instrument TY Recorder. Platelet aggregation is indicated by a decrease in optical density. Inhibition to collagen-induced platelet aggregation is considered significant when this inhibition is approximately equal that caused by an equimolar concentration of sulfinpyrazone [1,2-diphenyl-4-(2-phenylsulfinylethyl)-3,5-pyrazolidinedione].

Test compounds which inhibit aggregation by collagen comparable with or better than sulfinpyrazone (i.e. $6 \times 10^{-4}$ M) are indicated herein below:

4'-chloro-3,4-dihydro-2-methyl-4-oxo-2H-1,2-benxothiazine-3-carboxanilide-1,1-dioxide
2'-methoxy-3,4-dihydro-2-methyl-4-oxo-2H-1,2-benzothiazine-3-carboxanilide-1,1-dioxide
4'-methoxy-3,4-dihydro-2-methyl-4-oxo-2H-1,2-benzothiazine-3-carboxanilide-1,1-dioxide
2'-methyl-3,4-dihydro-2-methyl-4-oxo-2H-1,2-benzothiazine-3-carboxanilide-1,1-dioxide
4'-methyl-3,4-dihydro-2-methyl-4-oxo-2H-1,2-benzothiazine-3-carboxanilide-1,1-dioxide
3'-trifluoromethyl-3,4-dihydro-2-methyl-4-oxo-2H-1,2-benzothiazine-3-carboxanilide-1,1-dioxide
3'-chloro-3,4-dihydro-2-methyl-4-oxo-2H-1,2-benzothiazine-3-carboxanilide-1,1-dioxide
3',4'-dichloro-3,4-dihydro-2-methyl-4-oxo-2H-1,2-benzothiazine-3-carboxanilide-1,1-dioxide
2'-chloro-3,4-dihydro-2-methyl-4-oxo-2H-1,2-benzothiazine-3-carboxanilide-1,1-dioxide
4'-nitro-3,4-dihydro-2-methyl-4-oxo-2H-1,2-benzothiazine-3-carboxanilide-1,1-dioxide
4'-bromo-3,4-dihydro-2-methyl-4-oxo-2H-1,2-benzothiazine-3-carboxanilide-1,1-dioxide
3'-methyl-3,4-dihydro-2-methyl-4-oxo-2H-1,2-benzothiazine-3-carboxanilide-1,1-dioxide
4'-ethoxy-3,4-dihydro-2-methyl-4-oxo-2H-1,2-benzothiazine-3-carboxanilide-1,1-dioxide
N-($\alpha$-naphthyl)-3,4-dihydro-2-methyl-4-oxo-2H-1,2-benzothiazine-3-carboxamide-1,1-dioxide
N-cyclohexyl-3,4-dihydro-2-methyl-4-oxo-2H-1,2benzothiazine-3-carboxamide-1,1-dioxide
N-allyl-3,4-dihydro-2-methyl-4-oxo-2H-1,2-benzothiazine-3-carboxamide-1,1-dioxide
N-methyl-3,4-dihydro-2-methyl-4-oxo-2H-1,2-benzothiazine-3-carboxamide-1,1-dioxide
N-(n-butyl)-3,4-dihydro-2-methyl-4-oxo-1,2-benzothiazine-3-carboxamide-1,1-dioxide
3,4-dihydro-2-methyl-4-oxo-2H-1,2-benzothiazine-3-thiocarboxanilide-1,1-dioxide
N-allyl-3,4-dihydro-2-methyl-4-oxo-2H-1,2-benzothiazine-3-thiocarboxanilide-1,1-dioxide
3,4-dihydro-2-methyl-3-oxo-2H-1,2-benzothiazine-4-carboxanilide-1,1-dioxide
4'-fluoro-3,4-dihydro-2-methyl-3-oxo-2H-1,2-benzothiazine-4-carboxanilide-1,1-dioxide'
4'-chloro-3,4-dihydro-2-methyl-3-oxo-2H-1,2-benzothiazine-4-carboxanilide-1,1-dioxide
3'-trifluoromethyl-3,4-dihydro-2-methyl-3-oxo-2H-1,2-benzothiazine-4-carboxanilide-1,1-dioxide
4'-methyl-3,4-dihydro-2-methyl-3-oxo-2H-1,2-benzothiazine-4-carboxanilide-1,1-dioxide
4'-methoxy-3,4-dihydro-2-methyl-3-oxo-2H-1,2-benzothiazine-4-carboxanilide-1,1-dioxide
4'-nitro-3,4-dihydro-2-methyl-3-oxo-2H-1,2-benzothiazine-4-carboxanilide-1,1-dioxide
N-($\alpha$-naphthyl)-3,4-dihydro-2-methyl-3-oxo-2H-1,2-benzothiazine-4-carboxamide-1,1-dioxide
3'-methyl-3,4-dihydro-2-methyl-3-oxo-2H-1,2-benzothiazine-4-carboxanilide-1,1-dioxide
4'-ethoxy-3,4-dihydro-2-methyl-3-oxo-2H-1,2-benzothiazine-4-carboxanilide-1,1-dioxide
3'-chloro-3,4-dihydro-2-methyl-3-oxo-2H-1,2-benzothiazine-4-carboxanilide-1,1-dioxide
2'-methyl-3,4-dihydro-2-methyl-3-oxo-2H-1,2-benzothiazine-4-carboxanilide-1,1-dioxide
2',5'-dichloro-3,4-dihydro-2-methyl-3-oxo-2H-1,2-benzothiazine-4-carboxanilide-1,1-dioxide
2'-methoxy-3,4-dihydro-2-methyl-3-oxo-2H-1,2-benzothiazine-4-carboxanilide-1,1-dioxide
3',4'-dichloro-3,4-dihydro-2-methyl-3-oxo-2H-1,2-benzothiazine-4-carboxanilide-1,1-dioxide
2'-methyl-4'-nitro-2,4-dihydro-2methyl-3-oxo-2H-1,2-benzothiazine-4-carboxanilide-1,1-dioxide
N-allyl-3,4-dihydro-2-methyl-3-oxo-2H-1,2-benzothiazine-4-carboxamide-1,1-dioxide
3'-trifluoromethyl-4'-fluro-3,4-dihydro-2-methyl-3-oxo-1,2-benzothiazine-4-carboxanilide-1,1-dioxide
2',4'-difluro-3,4-dihydro-2-methyl-3-oxo-2H-1,2-benzothiazine-4-carboxanilide-1,1-dioxide
2'-fluoro-5'-trifluromethyl-3,4-dihydro-2-methyl-3-oxo-2H-1,2-benzothiazine-4-carboxanilide-1,1-dioxide 2'-trifluoromethyl-4'-bromo-3,4-dihydro-2-methyl-3-oxo-2H-1,2-benzothiazine-4-carboxanilide-1,1-dioxide 4'-trifluoromethyl-3,4-dihydro-2-methyl-3-oxo-2H-1,2-benzothiazine-4-carboxanilide-1,1-dioxide 3'-trifluoromethyl-4'-bromo-2-methyl-3-oxo-2H-1,2-benzothiazine-4-carboxanilide-1,1-dioxide 4'-methylsulfonyl-3,4-dihydro-2-methyl-3-oxo-2H-1,2-benzothiazine-4-carboxanilide-1,1-dioxide 4'-acetyl-3,4-dihydro-2-methyl-3-oxo-2H-1,2-benzothiazine-4-carboxanilide-1,1-dioxide 4'-dimethylsulfamyl-3,4-dihydro-2-methyl-3-oxo-2H-1,2-benzothiazine-4-carboxanilide-1,1-dioxide 2',4'-dichloro-3,4-dihydro-2-methyl-4-oxo-2H-1,2-benzothiazine-3-carboxanilide-1,1-dioxide.

2',4'-dimethoxy-3,4-dihydro-2-methyl-4-oxo-2H-1,2-benzothiazine-3-carboxanilide-1,1-dioxide.

3',4'-dimethyl-3,4-dihydro-2-methyl-4-oxo-2H-1,2-benzothiazine-3-carboxanilide-1,1-dioxide.

4'-trifluoromethyl-3,4-dihydro-2-methyl-4-oxo-2H-1,2-benzothiazine-3-carboxanilide-1,1-dioxide.

3'-chloro-4'-methyl-3,4-dihydro-2-methyl-4-oxo-2H-1,2-benzothiazine-3-carboxanilide-1,1-dioxide.

2'-methyl-3'-chloro-3,4-dihydro-2-methyl-4-oxo-2H-1,2-benzothiazine-3-carboxanilide-1,1-dioxide.

3'-bromo-3,4-dihydro-2-methyl-4-oxo-2H-1,2-benzothiazine-3-carboxanilide-1,1-dioxide.

[N-(β-phenylethyl)]-3,4-dihydro-2-methyl-4-oxo-2H-1,2-benzothiazine-3-carboxamide-1,1-dioxide.

3'-hydroxy-3,4-dihydro-2-methyl-4-oxo-2H-1,2-benzothiazine-3-carboxanilide-1,1-dioxide.

2'-methoxy-5'-chloro-3,4-dihydro-2-methyl-4-oxo-2H-1,2-benzothiazine-3carboxanilide-1,1-dioxide.

2'-fluoro-5'-trifluoromethyl-3,4-dihydro-4-oxo-2H-1,2-benzothiazine-3-carboxanilide-1,1-dioxide.

N-cycloheptyl-3,4-dihydro-2-methyl-4-oxo-2H-1,2-benzothiazine-3-carboxamide-1,1-dioxide.

2'-trifluoromethyl-4'-chloro-3,4-dihydro-4-oxo-2H-1,2-benzothiazine-3-carboxanilide-1,1-dioxide.

3',5'-dichloro-3,4-dihydro-2-methyl-4-oxo-2H-1,2-benzothiazine-3-carboxanilide-1,1-dioxide.

3'-fluoro-3,4-dihydro-2-methyl-4-oxo-2H-1,2-benzothiazine-3-carboxanilide-1,1-dioxide.

N-benzyl-3,4-dihydro-2-methyl-4-oxo-2H-1,2-benzothiazine-3-carboxamide-1,1-dioxide.

2'-trifluoromethyl-3,4-dihydro-2-methyl-4-oxo-2H-1,2-benzothiazine-3-carboxanilide-1,1-dioxide.

2'-chloro-5'-trifluoromethyl-3,4-dihydro-2-methyl-4-oxo-2H-1,2-benzothiazine-3-carboxanilide-1,1-dioxide.

3'-trifluoromethyl-4'-chloro-3,4-dihydro-2-methyl-4-oxo-2H-1,2-benzothiazine-3-carboxanilide-1,1-dioxide.

3'-chloro-4'-fluoro-3,4-dihydro-3,4-dihydro-2-methyl-4-oxo-2H-1,2-benzothiazine-3-carboxanilide-1,1-dioxide.

4'-hydroxy-3,4-dihydro-2-methyl-4-oxo-2H-1,2-benzothiazine-3-carboxanilide-1,1-dioxide.

2'-hydroxy-3,4-dihydro-2-methyl-4-oxo-2H-1,2-benzothiazine-3-carboxanilide-1,1-dioxide.

3'-hydroxy-3,4-dihydro-2-methyl-4-oxo-2H-1,2-benzothiazine-3-carboxanilide-1,1-dioxide.

3'-methoxy-3,4-dihydro-2-methyl-4-oxo-2H-1,2-benzothiazine-3-carboxanilide-1,1-dioxide.

3',4'-dimethoxy-3,4-dihydro-2-methyl-4-oxo-2H-1,2-benzothiazine-3-carboxanilide-1,1-dioxide.

2'-bromo-3,4-dihydro-2-methyl-4-oxo-2H-1,2-benzothiazine-3-carboxanilide-1,1-dioxide.

4'-(n-butyl)-3,4-dihydro-2-methyl-4-oxo-2H-1,2-benzothiazine-3-carboxanilide-1,1-dioxide.

2'-hydroxy-4'-chloro-3,4-dihydro-2-methyl-4-oxo-2H-1,2-benzothiazine-3-carboxanilide-1,1-dioxide.

2'-methyl-5'-chloro-3,4-dihydro-2-methyl-4-oxo-2H-1,2-benzothiazine-3-carboxanilide-1,1-dioxide.

2',5'-dibromo-3,4-dihydro-2-methyl-4-oxo-2H-1,2-benzothiazine-3-carboxanilide-1,1-dioxide.

2',3'-dichloro-3,4-dihydro-2-methyl-4-oxo-2H-1,2-benzothiazine-3-carboxanilide-1,1-dioxide.

2',4'-difluoro-3,4-dihydro-2-methyl-4-oxo-2H-1,2-benzothiazine-3-carboxanilide-1,1-dioxide.

2',5'-difluoro-3,4-dihydro-2-methyl-4-oxo-2H-1,2-benzothiazine-3-carboxanilide-1,1-dioxide.

2',5'-dimethoxy-3,4-dihydro-2-methyl-4-oxo-2H-1,2-benzothiazine-3-carboxanilide-1,1-dioxide.

3',5'-dimethoxy-3,4-dihydro-2-methyl-4-oxo-2H-1,2-benzothiazine-3-carboxanilide-1,1-dioxide 2',3'-dimethyl-3,4-dihydro-2-methyl-4-oxo-2H-1,2-benzothiazine-3-carboxanilide-1,1-dioxide 2',5'-dimethyl-3,4-dihydro-2-methyl-4-oxo-2H-1,2-benzothiazine-3-carboxanilide-1,1-dioxide 2'-ethyl-3,4-dihydro-2-methyl-4-oxo-2H-1,2-benzothiazine-3-carboxanilide-1,1-dioxide N-(7-indazolyl)-2-methyl-3,4-dihydro-4-oxo-2H-1,2-benzothiazine-3-carboxamide-1,1-dioxide 2'-fluoro-5'-methyl-3,4-dihydro-2-methyl-4-oxo-2H-1,2-benzothiazine-3-carboxanilide-1,1-dioxide 2'-methyl-5'-fluoro-3,4-dihydro-2-methyl-4-oxo-2H-1,2-benzothiazine-3-carboxanilide-1,1-dioxide 2'-trifluoromethyl-4'-fluoro-3,4-dihydro-2-methyl-4-oxo-2H-1,2-benzothiazine-3-carboxanilide-1,1-dioxide 2'-methoxy-5'-methyl-3,4-dihydro-2-methyl-4-oxo-2H-1,2-benzothiazine-3-carboxanilide-1,1-dioxide 4'-thiomethoxy-3,4-dihydro-2-methyl-4-oxo-2H-1,2-benzothiazine-3-carboxanilide-1,1-dioxide 3'-nitro-3,4-dihydro-2-methyl-4-oxo-2H-1,2-benzothiazine-3-carboxanilide-1,1-dioxide 2'-trifluoromethyl-4'-bromo-3,4-dihydro-2-methyl-4-oxo-2H-1,2-benzothiazine-3-carboxanilide-1,1-dioxide 2'-bromo-5'-trifluoromethyl-3,4-dihydro-2-methyl-4-oxo-2H-1,2-benzothiazine-3-carboxanilide-1,1-dioxide 3'-trifluoromethyl-4'-bromo-3,4-dihydro-2-methyl-4-oxo-2H-1,2-benzothiazine-3-carboxanilide-1,1-dioxide N-(2-benzothiazolyl)-3,4-dihydro-2-methyl-4-oxo-2H-1,2-benzothiazine-3-carboxamide-1,1-dioxide N-(2-pyrazinyl)-3,4-dihydro-2-methyl-4-oxo-2H-1,2-benzothiazine-3-carboxamide-1,1-dioxide N-(2-pyrimidyl)-3,4-dihydro-2-methyl-4-oxo-2H-1,2-benzothiazine-3-carboxamide-1,1-dioxide N-(2-pyridyl)-3,4-dihydro-2-methyl-4-oxo-2H-1,2-benzothiazine-3-carboxamide-1,1-dioxide N-(4-methyl-2-thiazolyl)-3,4-dihydro-2-methyl-4-oxo-2H-1,2-benzothiazine-3-carboxamide-1,1-dioxide N-[3-(1,2,4-triazinyl)]-3,4-dihydro-2-methyl-4-oxo-2H-1,2-benzothiazine-3-carboxamide-1,1-dioxide N-(6-methoxy-3-pyridazinyl)-3,4-dihydro-2-methyl-4-oxo-2H-1,2-benzothiazine-3-carboxamide-1,1-dioxide N-(4,5-dimethyl-2-pyrimidyl)-3,4-dihydro-2-methyl-4-oxo-2H-1,2-benzothiazine-3-carboxamide-1,1-dioxide N-(4-phenyl-2-thiazolyl)-3,4-dihydro-2-methyl-4-oxo-2H-1,2-benzothiazine-3-carboxamide-1,1-dioxide N-(1-phenyl-3-pyrazolonyl-5)-3,4-dihydro-2-methyl-4-oxo-2H-1,2-benzothiazine-3-carboxamide-1,1-dioxide N-(3-hydroxy-2-pyridyl)-3,4-dihydro-2-methyl-4-oxo-2H-1,2-benzothiazine-3-carboxamide-1,1-dioxide N-[3-(6-phenyl-1,2,r-triazolyl)]-3,4-dihydro-2-methyl-4-oxo-2H-1,2-benzothiazine-3-carboxamide-1,1-dioxide N-(5-bromo-2-thiazolyl)-3,4-dihydro-2-methyl-4-oxo-2H-1,2-benzothiazine-3-carboxamide-1,1-dioxide N-(5-carboxamide-2-pyridyl)-3,4-dihydro-2-methyl-4-oxo-2H-1,2-benzothiazine-3-carboxamide-1,1-dioxide N-(4,5-dimethyl-2-thiazolyl)-3,4-dihydro-2-methyl-4-oxo-2H-1,2-benzothiazine-3-carboxamide-1,1-dioxide N-(4-chloro-2-benzothiazolyl)-3,4-dihydro-2-methyl-4-oxo-2H-1,2-benzothiazine-3-carboxamide-1,1-dioxide N-(6-methyl-2-benzothiazolyl)-3,4-dihydro-2-methyl-4-oxo-2H-1,2-benzothiazine-3-carboxamide-1,1-dioxide N-(6-bromo-2-benzothiazolyl)-3,4-dihydro-2-methyl-4-oxo-2H-1,2-benzothiazine-3-carboxamide-1,1-dioxide N-(5-bromo-2-pyridyl)-3,4-dihydro-2-methyl-4-oxo-2H-1,2-benzothiazine-3-carboxamide-1,1-dioxide N-(5-chloro-2-pyridyl)-3,4-dihydro-2-methyl-4-oxo-2H-1,2-benzothiazine-3-carboxamide-1,1-dioxide N-(4,6-dimethyl-2-pyridyl)-3,4-dihydro-2-methyl-4-oxo-2H-1,2-benzothiazine-3-carboxamide-1,1-dioxide N-(5-nitro-2-pyridyl)-3,4-dihydro-2-methyl-4-oxo-2H-1,2-benzothiazine-3-carboxamide-1,1-dioxide N-(5-methyl-2-pyridyl)-3,4-dihydro-2-methyl-4-oxo-2H-1,2-benzothiazine-3-carboxamide-1,1-dioxide N-(6-methyl-2-pyridyl)-3,4-dihydro-2-methyl-4-oxo-2H-1,2-benzothiazine-3-carboxamide-1,1-dioxide N-(4-methyl-2-pyridyl)-3,4-dihydro-2-methyl-4-oxo-2H-1,2-benzothiazine-3-carboxamide-1,1-dioxide N-(3-methyl-2-pyridyl)-3,4-dihydro-2-methyl-4-oxo-2H-1,2-benzothiazine-3-carboxamide-1,1-dioxide N-(3-pyridyl)-3,4-dihydro-2-methyl-4-oxo-2H-1,2-benzothiazine-3-carboxamide-1,1-dioxide N-(4-pyridyl)-3,4-dihydro-2-methyl-4-oxo-2H-1,2-benzothiazine-3-carboxamide-1,1-dioxide

[N-2-(5-methyl-1,3,4-thiadiazinyl)]-3,4-dihydro-2-methyl-4-oxo-2H-1,2-benzothiazine-1,1-dioxide N-(5-chloro-2-benzoxazolyl)-3,4-dihydro-2-methyl-4-oxo-2H-1,2-benzothiazine-3-carboxamide-1,1-dioxide N-(2-thiazolyl)-4-hydroxy-2-methyl-2H-1,2-benzothiazine-3-carboxamide-1,1-dioxide 2',4'-dimethoxy-3,4-dihydro-2-methyl-3-oxo-2H-1,2-benzothiazine-4-carboxanilide-1,1-dioxide 4'-thiomethoxy-3,4-dihydro-2-methyl-3-oxo-2H-1,2-benzothiazine-4-carboxanilide-1,1-dioxide 3'-choro-4'-methyl-3,4-dihydro-2-methyl-3-oxo-2H-1,2-benzothiazine-4-carboxanilide-1,1-dioxide 4'-iodo-3,4-dihydro-2-methyl-3-oxo-2H-1,2-benzothiazine-4-carboxanilide-1,1-dioxide 4'-(n-butyl)-3,4-dihydro-2-methyl-3-oxo-2H-1,2-benzothiazine-4-carboxanilide-1,1-dioxide N-(n-amyl)-3,4-dihydro-2-methyl-3-oxo-2H-1,2-benzothiazine-4-carboxamide-1,1-dioxide N-cyclohexyl-3,4-dihydro-2-methyl-3-oxo-2H-1,2-benzothiazine-4-carboxamide-1,1-dioxide N-($\beta$-phenylethyl)-3,4-dihydro-2-methyl-3-oxo-2H-1,2-benzothiazine-4-carboxamide-1,1-dioxide

EXAMPLE II

Collagen-induced aggregation was inhibited with platelets from each of three dogs treated orally with a single dose, 1 mg/kg, of N-(2-thiazolyl)-4-hydroxy-2-methyl-2H-1,2-benzothiazine-3-carboxamide-1,1-dioxide. This effect was evident one hour following drug administration and persisted for about 96 hours in two dogs and 120 hours in the third.

N-(2-thiazolyl)-4-hydroxy-2-methyl-2H-1,2-benzothiazine-3-carboxamide-1,1-dioxide, dissolved in 0.154 M NaCl, was administered intravenously to dogs. Collagen-induced platelet aggregation was inhibited with platelets from these dogs for up to 6 to 11 days after a single intravenous injection of 2 mg, 5 mg or 10 mg/kg.

Similar results are obtained with the following compounds:

4'-bromo-3,4-dihydro-2-methyl-3-oxo-2H-1,2-benzothiazine-4-carboxanilide-1,1-dioxide 3,4-dihydro-2-methyl-4-oxo-2H-1,2-benzothiazine-3-carboxanilide-1,1-dioxide N-(2-thiazolyl)-4-hydroxy-2,4'-dimethyl-2H-1,2-benzothiazine-3-carboxamide-1,1-dioxide 4-hydroxy-2-methyl-N-(2-pyridyl)-2H-1,2-benzothiazine-3-carboxamide-1,1-dioxide N-(4,5-dimethyl-2-thiazolyl)-4-hydroxy-2-methyl-2H-1,2-benzothiazine-3-carboxamide-1,1-dioxide N-(6-methyl-2-pyridyl)-4-hydroxy-2-methyl-2H-1,2-benzothiazine-1,1-dioxide N-(4-methyl-2-pyridyl)-4-hydroxy-2-methyl-2H-1,2-benzothiazine-3-carboxamide-1,1-dioxide N-(6-methyl-2-pyridyl)-4-hydroxy-2-methyl-2H-1,2-benzothiazine-3-carboxamide-1,1-dioxide N-(5-chloro-2-pyridyl)-4-hydroxy-2-methyl-2H-1,2-benzothiazine-3-carboxamide-1,1-dioxide

EXAMPLE III

A dry solid pharmaceutical composition is prepared by blending the following materials together in the proportions by weight specified below:

| | |
|---|---|
| N-(2-thiazolyl)-4-hydroxy-2-methyl-1,2-benzothiazine-3-carboxamide-1,1-dioxide | 50 |
| Calcium carbonate | 20 |
| Polyethylene glycol, average molecular weight 4000 | 30 |

The dry solid mixture so prepared is then thoroughly agitated so as to obtain a powdered product that is completely uniform. Soft elastic and hard filled gelatin capsules containing this pharmaceutical composition are then prepared, employing a sufficient quantity of material in each case so as to provide each capsule with 50 mg of the active ingredient. Similarly, the formula is modified so as to provide each capsule with 1 mg of the active ingredient.

An oral dose of a single 50 mg capsule was administered to each of eight human volunteers. Collagen-induced plately aggregation and release of platelet adenosine diphosphate were diminished in each of five subjects at 1, 2 and 6 hours after drug ingestion. Both responses, to a lesser extent, were still inhibited in these subjects at 24 hours. At 48 to 72 hours after the single oral dose of the drug, the responses had returned to control levels. In the sixth subject, collagen-induced platelet aggregation and release of platelet adenosine diphosphate were diminished at 1 and 2 hours after a single oral dose of 50 mg but not at later intervals. In the remaining two subjects, both responses were inhibited at 6 hours.

Collagen-induced plately aggregation and release of platelet adenosine diphosphate may be diminished by the administration of an oral dose of a single capsule containing one mg of active ingredient.

What is claimed is:

1. A method for the treatment of thrombosis in dogs and humans which comprises the oral or intravenous administration to dogs and the oral administration to humans both in need of such treatment of an effective dose of from 1 to 50 mg per day of a compound selected from the group consisting of those of the formulae:

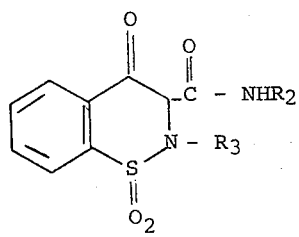 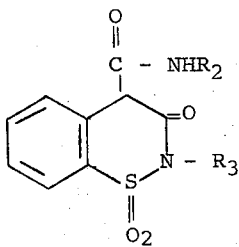

I  II and the base salts thereof with pharmacologically acceptable cations, wherein $R_2$ is selected from the group consisting of alkyl having from one to three carbon atoms, phenyl, naphthyl, pyridyl, 3-methyl-2-pyridyl, 4-methyl-2-pyridyl, 5-methyl-2-pyridyl, 6-methyl-2-pyridyl, 5-chloro-2-pyridyl, 5-bromo-2-pyridyl, 2-pyrazinyl, 2-pyrimidyl, 4-pyrimidyl, 2-thiazolyl, 4-methyl-2-thiazolyl, 5-bromo-2-thiazolyl, 4,5-dimethyl-2-thiazolyl and mono and di-substituted phenyl wherein each substitutent is fluorine, bromine, chlorine, alkoxy having from one to three carbon atoms or trifluoromethyl; $R_3$ is a member selected from the group consisting of hydrogen and alkyl having from one to three carbon atoms.

2. The method of claim 1 wherein said compound is a 3,4-dihydro-4-oxo-2H-1,2-benzothiazine-3-carboxamide-1,1-dioxide wherein $R_2$ is phenyl and $R_3$ is alkyl having from one to three carbon atoms.

3. The method of claim 1 wherein said compound is a 3,4-dihydro-4-oxo-2H-1,2-benzothiazine-3-carboxamide-1,1-dioxide wherein $R_2$ is chlorophenyl and $R_3$ is alkyl having from one to three carbon atoms.

4. The method of claim 1 wherein said compound is a 3,4-dihydro-4-oxo-2H-1,2-benzothiazine-3-carboxamide-1,1-dioxide wherein $R_2$ is dichlorophenyl and $R_3$ is alkyl having from one to three carbon atoms.

5. The method of claim 1 wherein said compound is a 3,4-dihydro-4-oxo-2H-1,2-benzothiazine-3-carboxamide-1,1-dioxide wherein $R_2$ is phenyl and $R_3$ is hydrogen.

6. The method of claim 1 wherein said compound is a 3,4-dihydro-4-oxo-2H-1,2-benzothiazine-3-carboxamide-1,1-dioxide wherein $R_2$ is 2-thiazolyl and $R_3$ is alkyl having from one to three carbon atoms.

7. The method of claim 1 wherein said compound is a 3,4-dihydro-4-oxo-2H-1,2-benzothiazine-3-carboxamide-1,1-dioxide wherein $R_2$ is pyridyl and $R_3$ is alkyl having from one to three carbon atoms.

8. The method of claim 1 wherein said compound is a 3,4-dihydro-4-oxo-2H-1,2-benzothiazine-3-carboxamide-1,1-dioxide wherein $R_2$ is methyl-2-pyridyl and $R_3$ is alkyl having from one to three carbon atoms.

9. The method of claim 1 wherein said compound is a 3,4-dihydro-3-oxo-2H-1,2-benzothiazine-4-carboxamide-1,1-dioxide wherein $R_2$ is phenyl and $R_3$ is alkyl having from one to three carbon atoms.

10. The method of claim 1 wherein said compound is a 3,4-dihydro-3-oxo-2H-1,2-benzothiazine-4-carboxamide-1,1-dioxide wherein $R_2$ is chlorophenyl and $R_3$ is alkyl having from one to three carbon atoms.

11. The method of claim 1 wherein said compound is a 3,4-dihydro-3-oxo-2H-1,2-benzothiazine-4-carboxamide-1,1-dioxide wherein $R_2$ is pyridyl and $R_3$ is alkyl having from one to three carbon atoms.

12. The method of claim 1 wherein said compound is a 3,4-dihydro-3-oxo-2H-1,2-benzothiazine-4-carboxamide-1,1-dioxide wherein $R_2$ is bromophenyl and $R_3$ is alkyl having from one to three carbon atoms.

13. The method of claim 1 wherein said compound is a 3,4-dihydro-3-oxo-2H-1,2-benzothiazine-4-carboxamide-1,1-dioxide wherein $R_2$ is naphthyl and $R_3$ is alkyl having from one to three carbon atoms.

14. The method of claim 1 wherein said compound is 3,4-dihydro-2-methyl-4-oxo-2H-1,2-benzothiazine-3-carboxanilide-1,1-dioxide.

15. The method of claim 1 wherein said compound is N-(2-thiazolyl)-4-hydroxy-2-methyl-2H-1,2-benzothiazine-3-carboxamide-1,1-dioxide.

16. The method of claim 1 wherein said compound is 4'-bromo-3,4-dihydro-2-methyl-3-oxo-2H-1,2-benzothiazine-4-carboxanilide-1,1-dioxide.

17. The method of claim 1 wherein said compound is 4-hydroxy-2-methyl-N-(2-pyridyl)-2H-1,2-benzothiazine-3-carboxamide-1,1-dioxide.

18. The method of claim 1 wherein said compound is N-(4,5-dimethyl-2-thiazolyl)-4-hydroxy-2-methyl-2H-1,2-benzothiazine-3-carboxamide-1,1-dioxide.

19. The method of claim 1 wherein said compound is N-(4-methyl-2-pyridyl)-4-hydroxy-2-methyl-2H-1,2-benzothiazine-3-carboxamide-1,1-dioxide.

20. The method of claim 1 wherein said compound is N-(6-methyl-2-pyridyl)-4-hydroxy-2-methyl-2H-1,2-benzothiazine-3-carboxamide-1,1-dioxide.

21. The method of claim 1 wherein said compound is N-(5-chloro-2-pyridyl)-4-hydroxy-2-methyl-2H-1,2-benzothiazine-3-carboxamide-1,1-dioxide.

22. The method of claim 1 wherein said compound is N-(5-bromo-2-pyridyl)-4-hydroxy-2-methyl-2H-1,2-benzothiazine-3-carboxamide-1,1-dioxide.

* * * * *